United States Patent
Wada et al.

(10) Patent No.: US 9,460,852 B2
(45) Date of Patent: Oct. 4, 2016

(54) LAMINATED CERAMIC CAPACITOR

(71) Applicant: MURATA MANUFACTURING CO., LTD., Nagaokakyo-shi, Kyoto-Fu (JP)

(72) Inventors: Hiroyuki Wada, Nagaokakyo (JP);
Kohei Shimada, Nagaokakyo (JP);
Kenji Takagi, Nagaokakyo (JP);
Tomomi Koga, Nagaokakyo (JP);
Tomotaka Hirata, Nagaokakyo (JP);
Hitoshi Nishimura, Nagaokakyo (JP);
Hiroki Awata, Nagaokakyo (JP); Sui Uno, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 74 days.

(21) Appl. No.: 14/210,786

(22) Filed: Mar. 14, 2014

(65) Prior Publication Data
US 2014/0285948 A1 Sep. 25, 2014

(30) Foreign Application Priority Data
Mar. 19, 2013 (JP) ................................ 2013-056669

(51) Int. Cl.
*H01G 4/30* (2006.01)
*H01G 4/06* (2006.01)
*H01G 4/12* (2006.01)

(52) U.S. Cl.
CPC .......... *H01G 4/1227* (2013.01); *H01G 4/1218* (2013.01); *H01G 4/30* (2013.01)

(58) Field of Classification Search
USPC ............................................. 361/301.4, 311
See application file for complete search history.

(56) References Cited

U.S. PATENT DOCUMENTS

| 7,532,453 B2* | 5/2009 | Yamamoto | H01G 4/232 361/306.1 |
| 7,813,104 B2* | 10/2010 | Nakano et al. | 361/301.4 |
| 8,995,109 B1* | 3/2015 | Tsutsumi | 361/301.4 |

(Continued)

FOREIGN PATENT DOCUMENTS

| JP | S60-103690 A | 6/1985 |
| JP | 06-084695 | 3/1994 |
| JP | H06-84692 A | 3/1994 |

(Continued)

OTHER PUBLICATIONS

Japanese Office Action dated Aug. 11, 2015, issued for counterpart application JP2013-056669 (with English translation).

*Primary Examiner* — Eric Thomas
(74) *Attorney, Agent, or Firm* — Arent Fox LLP

(57) ABSTRACT

A laminated ceramic capacitor having a laminated body composed of a plurality of ceramic layers for inner layers; a plurality of internal electrodes at the interfaces between the plurality of ceramic layers for inner layers; and a plurality of ceramic layers for outer layers, provided on the top and bottom so as to sandwich the plurality of ceramic layers for inner layers. The ceramic layers for inner layers are composed of a material containing a multiple oxide including an alkaline-earth metal. The ceramic layers for outer layers respectively have $TiO_2$ ceramic layers containing $TiO_2$ as their main constituent for certain layers including the outermost layers, and multiple oxide ceramic layers containing a multiple oxide including an alkaline-earth metal for the other layers.

5 Claims, 1 Drawing Sheet

(56) References Cited

U.S. PATENT DOCUMENTS

| | | | |
|---|---|---|---|
| 2006/0158827 A1* | 7/2006 | Lee | H01G 4/30 361/311 |
| 2013/0314841 A1* | 11/2013 | Oguni | 361/301.4 |
| 2014/0085767 A1* | 3/2014 | Kang | 361/301.4 |

FOREIGN PATENT DOCUMENTS

| | | |
|---|---|---|
| JP | H09-148175 A | 6/1997 |
| JP | H09-312234 A | 12/1997 |
| JP | 2005-317776 A | 11/2005 |
| JP | 2011-014940 A | 1/2011 |

* cited by examiner

LAMINATED CERAMIC CAPACITOR

CROSS REFERENCE TO RELATED APPLICATIONS

The present application claims priority to Japanese Patent Application No. 2013-056669, filed Mar. 19, 2013, the entire contents of which is incorporated herein by reference.

BACKGROUND OF THE INVENTION

1. Field of the Invention

The present invention relates to a laminated ceramic capacitor using a dielectric ceramic.

2. Description of the Related Art

As described in JP 6-84692 A, in general, laminated ceramic capacitors include a ceramic body and external electrodes. The ceramic body has two principal surfaces opposed to each other, two side surfaces opposed to each other, and two end surfaces opposed to each other. The external electrodes are formed respectively on the two end surfaces of the ceramic body.

The ceramic body is a laminated body composed of: a plurality of ceramic layers for inner layers; a plurality of internal electrodes provided at the interfaces between the ceramic layers for inner layers; and a plurality of ceramic layers for outer layers, provided on the top and bottom so as to sandwich the plurality of ceramic layers for inner layers. The internal electrodes are electrically connected to the external electrodes.

The dielectric materials for use in the ceramic layers for inner layers are typically multiple oxides, many of which are perovskite-type compounds such as $BaTiO_3$ and $CaZrO_3$. These multiple oxides need to be prepared by synthesizing multiple expensive materials, in order to meet a wide variety of properties such as electrical properties and microstructure control. Therefore, the ceramic layers for inner layers are expensive in production cost.

On the other hand, the same dielectric material as the ceramic layers for inner layers is typically used for the ceramic layers for outer layers. Therefore, the ceramic layers for outer layers are also expensive in production cost.

SUMMARY OF THE INVENTION

However, the ceramic layers for outer layers make almost no contribution to electrical characteristics of capacitors, unlike the ceramic layers for inner layers. Therefore, it is not always necessary to use the same expensive dielectric material as the ceramic layers for inner layers, for the dielectric material for use in the ceramic layers for outer layers.

In addition, alkaline-earth metals included in the perovskite-type compounds are easily dissolved in organic acids contained in water-soluble fluxes containing an organic acid such as adipic acid or propionic acid as a main constituent for use in soldering. The laminated ceramic capacitors have residual stress generated, because the capacitors are composed of the internal electrodes (metal) and ceramic which differ in coefficient of linear thermal expansion. The ceramic layers for outer layers hold, at their surfaces, the internal electrodes and the ceramic layers for inner layers, and thus receive relatively stronger residual stress than a section with no internal electrodes formed at the side surfaces of the ceramic body on the ceramic layers for inner layers. Therefore, when the constituent of the ceramic layers for outer layers is eluted into a water-soluble flux to embrittle the ceramic layers for outer layers, there is the problem of generating structural defects due to the change with the passage of time during mounting by soldering or after the mounting by soldering.

Therefore, an object of the present invention is to provide a laminated ceramic capacitor which is inexpensive in production cost, and has ceramic layers for outer layers, which are less likely to be eluted into organic acids.

The present invention provides a laminated ceramic capacitor comprising:

a ceramic body that has two principal surfaces opposed to each other, two side surfaces opposed to each other, and two end surfaces opposed to each other;

external electrodes formed respectively on the two end surfaces of the ceramic body, where the ceramic body is a laminated body including a plurality of ceramic layers for inner layers, a plurality of internal electrodes provided at interfaces between the plurality of ceramic layers for inner layers, and a plurality of ceramic layers for outer layers, provided on the top and bottom so as to sandwich the plurality of ceramic layers for inner layers, the ceramic layers for inner layers contain a multiple oxide including an alkaline-earth metal, and of the ceramic layers for outer layers, provided on the top and bottom, at least one ceramic layer for outer layers comprises a ceramic containing $TiO_2$ as its main constituent in at least some layers including the outermost layer.

The multiple oxide including an alkaline-earth metal in the ceramic layers for inner layers is preferably a perovskite-type compound.

The present invention makes the production cost inexpensive, because it is not necessary to use, as the material of the ceramic layers for outer layers, the same expensive dielectric material as the ceramic layers for inner layers, and achieves ceramic layers for outer layers, which are excellent in resistance to elution, because $TiO_2$ is hardly dissolved in organic acids.

In addition, the present invention preferably consists in a laminated ceramic capacitor wherein the principal surface is different in color from the side surfaces.

When the color of the principal surface composed of the ceramic containing $TiO_2$ as its main constituent is different from the color of the side surfaces composed of the ceramic containing the multiple oxide mainly including an alkaline-earth metal, it is possible to visually distinguish the principal surfaces from the side surfaces.

According to the present invention, the ceramic layers for outer layers become inexpensive in production cost, because it is not necessary to use, as the material of the ceramic layers for outer layers, the same expensive dielectric material as the ceramic layers for inner layers. In addition, ceramic layers for outer layers are achieved which are excellent in resistance to elution, because $TiO_2$ is hardly dissolved in organic acids. As a result, a laminated ceramic capacitor is achieved which is inexpensive in production cost, and has ceramic layers for outer layers, which are less likely to be eluted into organic acids.

The above-mentioned object, other objects, features, and advantages of the present invention will become further evident from the following description, which is given with the reference to the drawings.

DETAILED DESCRIPTION OF THE INVENTION

Next, an embodiment will be described with reference to a laminated ceramic capacitor according to the present invention, as well as a production method therefore.

1. Laminated Ceramic Capacitor

Figure 1:
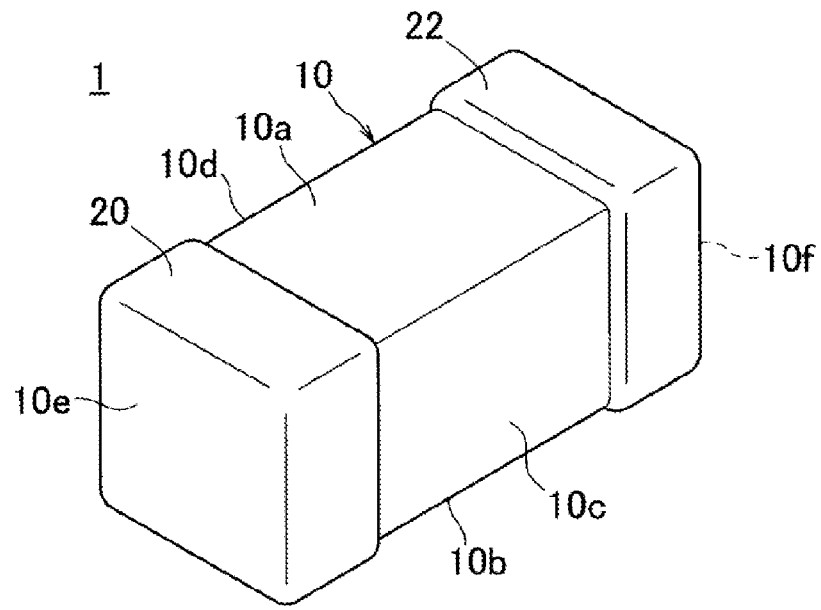
FIG. 1 is an external perspective view illustrating an embodiment of a laminated ceramic capacitor according to the present invention.
Figure 2:
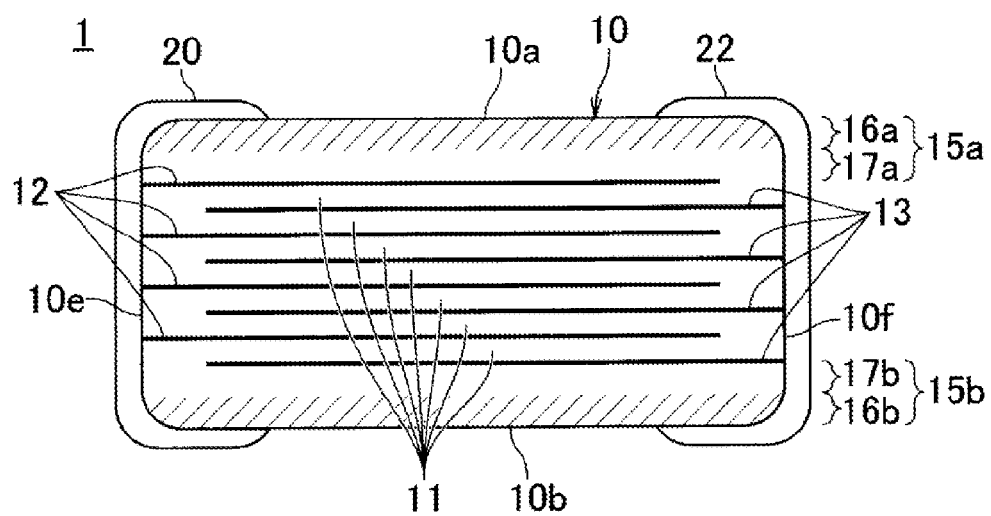

FIG. 1 is an external perspective view illustrating an embodiment of a laminated ceramic capacitor, and FIG. 2 is a cross-sectional schematic view illustrating the internal structure of the capacitor. The laminated ceramic capacitor 1 includes a ceramic body 10, and external electrodes 20 and 22 formed on the right and left ends of the ceramic body 10.

The ceramic body 10 has a principal surface (upper surface) 10a and a principal surface (mounted surface) 10b which are opposed to each other, a side surface 10c and a side surface 10d which are opposed to each other, and an end surface 10e and an end surface 10f which are opposed to each other.

The ceramic body 10 has a laminated body structure composed of a plurality of ceramic layers 11 for inner layers; a plurality of internal electrodes 12 and 13 provided at the interfaces between the plurality of ceramic layers 11 for inner layers; and ceramic layers 15a and 15b for outer layers, provided on the top and bottom so as to sandwich the plurality of ceramic layers 11 for inner layers.

The internal electrodes 12 and the internal electrodes 13 are opposed with the dielectric ceramic layers 11 for inner layers interposed therebetween in the thickness direction. The internal electrodes 12 and internal electrodes 13 opposed with the ceramic layers 11 for inner layers interposed therebetween form electrostatic capacitance. The internal electrodes 12 and 13 are composed of Ag, Cu, Ni, Pd, or an alloy of the metals, or the like.

The left-hand ends of the internal electrodes 12 are extracted to the left-hand end surface 10e of the ceramic body 10, and electrically connected to the external electrode 20. The right-hand ends of the internal electrodes 13 are extracted to the right-hand end surface 10f of the ceramic body 10, and electrically connected to the external electrode 22.

The ceramic layers 11 for inner layers are composed of a material containing a multiple oxide including an alkaline-earth metal. This multiple oxide is a perovskite-type compound such as $BaTiO_3$ and $CaZrO_3$.

The ceramic layers 15a and 15b for outer layers, which are provided on the top and bottom, respectively have $TiO_2$ ceramic layers 16a and 16b containing $TiO_2$ as their main constituent for certain layers including the outermost layers, and multiple oxide ceramic layers 17a and 17b containing a multiple oxide including an alkaline-earth metal for the other layers. However, all layers of the ceramic layers 15a and 15b for outer layers may be the $TiO_2$ ceramic layers 16a and 16b. Alternatively, the $TiO_2$ ceramic layers 16a and 16b may be provided for only either one of the upper and lower ceramic layers 15a and 15b for outer layers.

In addition, there is no harm in diffusing the elements constituting the ceramic layers 11 for inner layers into the $TiO_2$ ceramic layers 16a and 16b. Furthermore, the $TiO_2$ ceramic layers 16a and 16b may have minute amounts of additives added besides the $TiO_2$.

The thus configured laminated ceramic capacitor 1 becomes inexpensive in production cost, because it is not necessary to use, as the material of the ceramic layers 15a and 15b for outer layers, the same expensive dielectric material as the ceramic layers 11 for inner layers. Furthermore, the ceramic layers 15a and 15b for outer layers make almost no contribution to electrical characteristics of the capacitor, and thus can also use low-purity materials, and further reduce the production cost.

In addition, the ceramic layers 15a and 15b for outer layers are achieved which are excellent in resistance to elution, because the $TiO_2$ contained in the $TiO_2$ ceramic layers 16a and 16b is hardly dissolved in organic acids.

In addition, when the color of the principal surfaces 10a and 10b composed of the ceramic containing $TiO_2$ as its main constituent is different from the color of the side surfaces 10c and 10d composed of the ceramic containing the multiple oxide mainly including an alkaline-earth metal although the $TiO_2$ ceramic layers 16a and 16b are partially exposed at the side surfaces, it is possible to visually distinguish the principal surfaces 10a and 10b from the side surfaces 10c and 10d. Accordingly, the observation of the laminated ceramic capacitor 1 with an imaging camera or the like can distinguish the orientation of the laminated ceramic capacitor 1, and automatically align the mounting direction.

As a result, for example, the laminated ceramic capacitor 1 is mounted so that the internal electrodes 12 and 13 thereof are consistently parallel to a printed-circuit board (printed substrate). Accordingly, the value of floating capacitance is hardly fluctuated, which is generated between the internal electrodes 12 and 13 and the printed-circuit board, and the variation can be thus reduced in electrical characteristics of the laminated ceramic capacitor 1.

2. Method for Producing Laminated Ceramic Capacitor

Next, a method for producing the laminated ceramic capacitor 1 described previously will be described.

(Preparation of Green Sheets for Inner Layers)

A $BaCO_3$ powder and a $TiO_2$ powder are weighed so that the Ba/Ti ratio is 1.001, and subjected to wet mixing by means of a mill using $ZrO_2$ balls. This mixed slurry is dried, and then heated to 1000° C. to provide a $BaTiO_3$ powder of 5.8 $m^2/g$ in specific surface area.

Next, to 100 parts by mol of the $BaTiO_3$ powder, 1.0 part by mol of Dy, 1.5 parts by mol of Mg, 0.3 parts by mol of Mn, and 1.2 parts by mol of Ba are each added as a metal soap solution. Furthermore, this $BaTiO_3$ raw material, with 1.5 parts by mol of Si added thereto as an alkoxide and a mixed dispersion medium of toluene and ethyl alcohol added thereto, is subjected to wet mixing by means of a mill using $ZrO_2$ balls, thereby providing a slurry.

Next, the $BaTiO_3$ slurry is subjected to the removal of the mixed dispersion medium, then to the removal of the organic matters by a heat treatment at 500° C., and granulated to provide a ceramic raw material powder for inner layers. This ceramic raw material powder for inner layers, with a polybutyral binder and a plasticizer added thereto, and then a mixed dispersion medium of toluene and ethyl alcohol added thereto, is subjected to wet mixing by means of a mill using $ZrO_2$ balls, thereby providing a slurry. Next, this $BaTiO_3$ slurry is formed into the shape of a sheet by means of a gravure coater, as green sheets for inner layers of 1.0 µm in thickness. The green sheets for inner layers serve, after firing, as the ceramic layers 11 for inner layers of 0.85 µm in thickness.

(Preparation of $TiO_2$ Green Sheets)

A $TiO_2$ powder of 99.9% in purity and 6.6 $m^2/g$ in specific surface area, with a polybutyral binder and a plasticizer added thereto, and then a mixed dispersion medium of toluene and ethyl alcohol added thereto, is subjected to wet mixing by means of a mill using $ZrO_2$ balls, thereby providing a slurry. Next, this $TiO_2$ slurry is formed into the shape of a sheet by means of a gravure coater, $TiO_2$ as green sheets.

(Preparation of Laminated Ceramic Capacitor)

A conductive paste (for example, a Ni paste) is applied by screen printing onto the green sheets for inner layers to form conductive paste films (conductor patterns) for serving as the internal electrodes 12 and 13. Four hundreds of the green sheets for inner layers with the conductive paste films formed thereon are stacked so as to alternate the directions of extracting the ends of the conductive paste films.

Next, green sheet layers for outer layers are stacked on the top and bottom so as to sandwich the stacked green sheets for inner layers. More specifically, green sheets for outer layers, which comprise the same material as the green sheets for inner layers, and have no conductive paste films formed thereon, are stacked so as to reach a thickness of 48 μm. Furthermore, the $TiO_2$ green sheets are stacked on the outside of the stacked green sheet layers for outer layers, so as to reach a thickness of 7 μm. In this way, the unfired ceramic body 10 is formed to serve as a main body for the laminated ceramic capacitor 1.

This unfired ceramic body 10 is cut into a predetermined product size. The unfired ceramic body 10 cut into the size is subjected to a heat treatment at a temperature of 270° C. in a $N_2$ atmosphere, to burn and remove the binder. Thereafter, the unfired ceramic body 10 is heated up to a temperature of 1250° C., with a rate of temperature increase set at 30° C./min from 800° C. or more, in a reducing atmosphere composed of a $N_2$—$H_2$—$H_2O$ gas. The unfired ceramic body 10 is maintained for 15 minutes at a temperature of 1250° C., and thereby fired as the sintered ceramic body 10.

The green sheets for inner layers and for outer layers, the $TiO_2$ green sheets, and the conductive paste films are subjected to co-firing to provide the green sheets for inner layers as the ceramic layers 11 for inner layers, the $TiO_2$ green sheets as the $TiO_2$ ceramic layers 16a and 16b, the green sheets for outer layers as the multiple oxide ceramic layers 17a and 17b, and the conductive paste films to the internal electrodes 12 and 13.

The sintered ceramic body 10 is sized to have a length of 1.2 mm, a width of 0.7 mm, and a height of 0.7 mm, and prismatic in shape with a square-shaped transverse section.

Next, a Cu paste is applied to each of the both end surfaces 10e and 10f of the sintered ceramic body 10. Thereafter, the Cu paste on the sintered ceramic body 10 is subjected to baking at a temperature of 800° C. in a $N_2$ atmosphere to form the external electrodes 20 and 22 electrically connected to the internal electrodes 12 and 13. Furthermore, Ni—Sn plating is formed by wet plating on surface layers of the external electrodes 20 and 22.

EXPERIMENTAL EXAMPLES

1. Examples and Comparative Example

The respective laminated ceramic capacitors 1 according to examples and a comparative example were produced by the production method according to the embodiment described previously, except for the following description, and subjected to characterization.

Example 1

In Example 1, all layers of the ceramic layers 15a and 15b for outer layers, provided on the top and bottom, were adapted to serve as the $TiO_2$ ceramic layers 16a and 16b. The $TiO_2$ ceramic layers 16a and 16b (that is, the ceramic layers 15a and 15b for outer layers) were each 55 μm in thickness at the time of being unfired.

Example 2

In Example 2, the ceramic layers 15a and 15b for outer layers, provided on the top and bottom, were adapted to serve as the $TiO_2$ ceramic layers 16a and 16b for some layers including the outermost layers, and as the multiple oxide ceramic layers 17a and 17b for the other layers. The $TiO_2$ ceramic layers 16a and 16b were each 7 μm in thickness at the time of being unfired, and the multiple oxide ceramic layers 17a and 17b were each 48 μm in thickness at the time of being unfired. Accordingly, the ceramic layers 15a and 15b for outer layers were each 55 μm in thickness at the time of being unfired.

Example 3

In Example 3, all layers of the ceramic layer 15a for outer layers, provided on the top, were adapted to serve as the multiple oxide ceramic layer 17a. The multiple oxide ceramic layer 17a (that is, the ceramic layer 15a for outer layers) was 55 μm in thickness at the time of being unfired. On the other hand, the ceramic layer 15b for outer layers, provided on the bottom, was adapted to serve as the $TiO_2$ ceramic layer 16b for some layers including the outermost layers, and as the multiple oxide ceramic layer 17b for the other layers. The $TiO_2$ ceramic layer 16b was 48 μm in thickness at the time of being unfired, and the multiple oxide ceramic layer 17b was 7 μm in thickness at the time of being unfired. Accordingly, the ceramic layer 15b for outer layers was 55 μm in thickness at the time of being unfired.

Example 4

In Example 4, all layers of the ceramic layers 15a and 15b for outer layers, provided on the top and bottom, were adapted to serve as the $TiO_2$ ceramic layers 16a and 16b, as in the case of Example 1. Furthermore, a $TiO_2$ powder of 99% in purity and of 3.1 m²/g in specific surface area, containing 1 wt % of impurities in total with $Nb_2O_5$ accounting for 0.4 wt % of the impurities, was used for the material of the $TiO_2$ green sheets forming the $TiO_2$ ceramic layers 16a and 16b.

Example 5

In Example 5, all layers of the ceramic layers 15a and 15b for outer layers, provided on the top and bottom, were adapted to serve as the $TiO_2$ ceramic layers 16a and 16b, as in the case of Example 1. Furthermore, a material obtained by adding 1.5 parts by mol of Si as a $SiO_2$ powder with respect to 100 parts by mol of Ti to a $TiO_2$ powder of purity in 99.9% and of 6.6 m²/g in specific surface area was used for the material of the $TiO_2$ green sheets forming the $TiO_2$ ceramic layers 16a and 16b.

Example 6

In Example 6, all layers of the ceramic layers 15a and 15b for outer layers, provided on the top and bottom, were adapted to serve as the $TiO_2$ ceramic layers 16a and 16b, as in the case of Example 1. Furthermore, a material obtained by adding 0.35 parts by mol of Mn as a $MnCO_3$ powder with respect to 100 parts by mol of Ti to a $TiO_2$ powder of purity in 99.9% and of 6.6 m²/g in specific surface area was used for the material of the $TiO_2$ green sheets forming the $TiO_2$ ceramic layers 16a and 16b.

Comparative Example 1

In Comparative Example 1, all layers of the ceramic layers 15a and 15b for outer layers, provided on the top and bottom, were adapted to serve as the multiple oxide ceramic layers 17a and 17b, as in the case of conventional laminated ceramic capacitors.

2. Characterization in Examples and Comparative Example

The laminated ceramic capacitors 1 according to the examples and the comparative example were subjected to the following characterization.

(Measurement of Eluted Amount into Adipic Acid Solution)

Fifty pieces for each of the laminated ceramic capacitors 1 were immersed in a sample bottle containing 3 mL of a 0.2 mol/L of adipic acid solution. The sample bottle was hermetically sealed, and left still for 120 hours at a temperature of 85° C. After cooling, the laminated ceramic capacitors 1 were taken out, and the laminated ceramic capacitors 1 were subjected water washing with pure water until the adipic acid solution reached 5 mL. Next, the constituents contained in the adipic acid solution were quantified by ICP emission spectroscopy to figure out the total amount of the detected eluted elements other than oxygen in vol.

(Distinguishing between Color of Principal Surfaces and Color of Side Surfaces)

The colors of the principal surfaces 10a and 10b and side surfaces 10c and 10d of the laminated ceramic capacitors 1 were visually observed.

(Generation of Structural Defect after Mounting by Soldering)

Forty pieces for each of the laminated ceramic capacitors 1 immersed in the adipic acid solution were mounted by soldering on printed circuit boards with the use of a water-soluble flux containing an adipic acid as its main constituent. Twenty pieces of the laminated ceramic capacitor 1 were, immediately after the mounting by soldering, polished to expose vertical sections (LT sections) in the length direction, and the presence or absence of structural defects such as cracks was observed with an optical microscope. The other twenty pieces of the laminated ceramic capacitor 1 were, after the mounting by soldering, left still for 24 hours at ordinary temperature, and then similarly polished to expose LT sections, and the presence or absence of structural defects such as cracks was observed with an optical microscope.

3. Result of Characterization in Examples and Comparative Example

Table 1 shows the results of the characterization in the examples and the comparative examples.

surfaces 10a and 10b of the laminated ceramic capacitor 1 are composed of the $TiO_2$ ceramic layers 16a and 16b containing $TiO_2$ as their main constituent. This is because Ba contained in the multiple oxide ceramic layers 17a and 17b is not eluted from the principal surfaces 10a and 10b. As a result, it is recognized that the generation of structural defects after mounting by soldering is also reduced.

In addition, in the case of Examples 1 through 5, it is recognized that it is also possible to distinguish between the colors of the principal surfaces 10a and 10b and side surfaces 10a and 10d of the laminated ceramic capacitor 1. The color of the principal surfaces 10a and 10b ($TiO_2$ ceramic layers 16a and 16b) is obviously different in color tone as compared with the color of the side surfaces 10c and 10d (mainly the multiple oxide ceramic layers 17a and 17b), and easily distinguishable.

In addition, from Example 3, it is recognized that the advantageous effect of the present invention is produced even when the $TiO_2$ ceramic layer 16b is provided only for the lower ceramic layer 15b for outer layers whereas the $TiO_2$ ceramic layer 16a is not provided for the upper ceramic layer 15a for outer layers.

In addition, from Example 4, it is recognized that the advantageous effect of the present invention is produced even when the inexpensive low-purity $TiO_2$ powder is used as the material of the $TiO_2$ green sheets forming the $TiO_2$ ceramic layers 16a and 16b.

In addition, from Examples 5 and 6, it is recognized that the material with the minute amounts of additives added thereto besides $TiO_2$ may be used as the material of the $TiO_2$ green sheets forming the $TiO_2$ ceramic layers 16a and 16b.

It is to be noted that the present invention is not to be considered limited to the embodiment described previously, modified variously within the scope of the invention. In addition, the laminated ceramic capacitor is not to be considered limited thereto in terms of the thickness of the ceramic layers, the number of layers, the opposed electrode area, and the external dimensions.

What is claimed is:
1. A laminated ceramic capacitor comprising:
   a ceramic body including two principal surfaces opposed to each other, two side surfaces opposed to each other, and two end surfaces opposed to each other;
   external electrodes formed respectively on the two end surfaces of the ceramic body,

TABLE 1

| | $TiO_2$ ceramics | | | Generation of Structural Defect after Mounting by Soldering | | Distinguishing between Color of Principal Surface and Color of Side Surface |
|---|---|---|---|---|---|---|
| | Additive (Listed as Oxide) | Purity (%) | Eluted Amount into Adipic Acid (μmol) | Immediately After | After 24 hours | |
| Example 1 | None | 99.9 | 1.8 | 0/20 | 0/20 | Possible |
| Example 2 | None | 99.9 | 3.6 | 0/20 | 0/20 | Possible |
| Example 3 | None | 99.9 | 5.2 | 0/20 | 0/20 | Possible |
| Example 4 | None | 99 | 1.6 | 0/20 | 0/20 | Possible |
| Example 5 | $SiO_2$ | 99.9 | 2.8 | 0/20 | 0/20 | Possible |
| Example 6 | MnO | 99.9 | 2.2 | 0/20 | 0/20 | Impossible |
| * Comparative Example 1 | — | — | 10.2 | 20/20 | 20/20 | Impossible |

* Out of the present invention

From Table 1, it is recognized that the eluted amount of the adipic acid (organic acid) is reduced when the principal wherein the ceramic body is a laminated body including a first plurality of ceramic layers for inner layers, a plurality of internal electrodes provided at interfaces between the first plurality of ceramic layers for inner layers, and a second plurality of ceramic layers for outer layers arranged so as to sandwich the first plurality of ceramic layers for inner layers, the first ceramic layers for inner layers contain a multiple oxide including an alkaline-earth metal, and at least one outermost layer of the second plurality of ceramic layers for outer layers comprises a ceramic containing $TiO_2$ as its main constituent and elements constituting the first ceramic layers for inner layers.

2. The laminated ceramic capacitor according to claim 1, wherein the multiple oxide is a perovskite-type compound.

3. The laminated ceramic capacitor according to claim 1, wherein the second plurality of ceramic layers for outer layers further include multiple oxide ceramic layers.

4. The laminated ceramic capacitor according to claim 1, wherein opposed outermost layers of the second plurality of ceramic layers for outer layers, which together sandwich the first plurality of ceramic layers for inner layers, each comprise the ceramic containing $TiO_2$ as its main constituent.

5. The laminated ceramic capacitor according to claim 1, wherein at least one of the two principal surfaces is different in color from the side surfaces.

* * * * *